FIG. 1

INVENTOR.
RICHARD E. RIPLEY
BY
*Llike, Thompson + Bronstein*
ATTORNEYS

April 28, 1970 R. E. RIPLEY 3,508,563
PRECISION CONTROL OF FLUID FLOW
Filed Sept. 27, 1966 9 Sheets-Sheet 3

INVENTOR.
RICHARD E. RIPLEY
BY
Dike, Thompson + Bronstein
ATTORNEYS

April 28, 1970 R. E. RIPLEY 3,508,563
PRECISION CONTROL OF FLUID FLOW
Filed Sept. 27, 1966 9 Sheets-Sheet 8

INVENTOR.
RICHARD E. RIPLEY
BY
Dike, Thompson & Bronstein
ATTORNEYS

April 28, 1970    R. E. RIPLEY    3,508,563
PRECISION CONTROL OF FLUID FLOW
Filed Sept. 27, 1966    9 Sheets-Sheet 9

INVENTOR.
RICHARD E. RIPLEY
BY
*Llike, Thompson + Bronstein*
ATTORNEYS

United States Patent Office 3,508,563
Patented Apr. 28, 1970

3,508,563
PRECISION CONTROL OF FLUID FLOW
Richard E. Ripley, Attleboro, Mass., assignor to Textron Inc., Providence R.I., a corporation of Rhode Island
Filed Sept. 27, 1966, Ser. No. 582,427
Int. Cl. F15c 1/14
U.S. Cl. 137—81.5                              9 Claims

ABSTRACT OF THE DISCLOSURE

A fluid control device having a supply channel for providing a laminar main stream of fluid flow and an interaction chamber for providing a fluid control signal over a considerable portion of the main stream so as to apply a static pressure thereto in order to deflect the main stream, and said device also constructed with a tapered portion to counteract the laminar main stream from changing its velocity profile.

---

This invention relates to the control of fluid flow and more particularly to the precision control of such flow.

It is well known that a main stream of fluid, either gaseous or liquid, can be controlled by an auxiliary stream of lesser energy. As a result, low energy signals of an auxiliary control stream can be transferred to a higher energy main stream in amplified form. Devices which operate in this fashion are commonly known as fluid amplifiers.

A fluid amplifier may be operated either as a proportional, or as a discrete, device. In the case of a proportional amplifier, the output stream is essentially an amplified counterpart of the control stream. In the case of a discrete amplifier, a low energy control signal is able to bring about a relatively abrupt change in the condition of the output stream, e.g., by changing it from an "on" to an "off" condition.

Conventionally, both proportional and discrete amplifiers make use of streams which are turbulent over all, or a portion, of their flow. A turbulent stream is characterized by eddies and is to be contrasted with a smoothly flowing stream, which is said to be laminar.

Turbulent streams permit relatively high pressures, but have a number of disadvantages. In amplifiers where the control stream converts laminar flow into turbulent flow, there is a significant and variable delay in response. In amplifiers where the exercise of control entails the interaction of turbulent streams, small diameter nozzles are needed in order to obtain sufficiently high velocities. Such nozzles have a tendency to become clogged and pose serious fabrication problems.

In addition, fluid amplifiers with turbulent stream flow require high velocity control streams. Moreover, turbulent streams give rise to major noise problems, particularly where laminar flow is converted to turbulent flow. A spike of noise may cause a discrete amplifier to turn "off" when it should be "on," or in the case of the proportional amplifier, bring about a significant departure from the desired relationship between input, e.g. control, and output signals.

Accordingly, it is an object of the invention to facilitate the control and interaction of fluid streams. A related object is to achieve proportional fluid amplification over a preassigned range. A further object of the invention is to achieve fluid amplification with relatively low pressure control streams.

A further object is to overcome disadvantages of devices which make use of turbulent stream flow. A still further object is to achieve fluid amplification in which variability of delay is mitigated.

In accomplishing the foregoing and related objects, the invention provides for establishing a laminar main stream of fluid flow and deflecting the main stream in a nonturbulent, i.e., laminar, fashion by a low pressure control stream before the main stream reaches an outlet. Because the main stream is deflected without becoming turbulent, it remains directly responsive to the control streams, thus eliminating variability of delay. Moreover, the fact that the output derived from the main stream is always laminar, as opposed to turbulent, significantly curtails noise.

To permit the nonturbulent deflection of a main stream, a low pressure control stream, from at least one inlet duct enters a control cavity. The cavity is open along the course of the main stream and configured so that a bending force of the control stream is applied in a direction transverse to the flow of the main stream. The velocity of the control stream is kept low enough to prevent turbulent break-up of the main stream; at the same time the pressure of the control stream is applied over a sufficient length of the main stream to produce the desired deflection.

The control cavity constitutes a portion of an interaction chamber where the deflection takes place. A projection on the far end of the cavity extends into contact with the main stream flow and is proportioned to maintain the original course of the main stream. This is done by intercepting a small amount of the flow at the far end of the cavity. As a result, there is prevention of pressure components which otherwise could bend the main stream in the absence of a control signal.

In addition, the sidewalls of the cavity, and the remainder of the interaction chamber, are tapered in the longitudinal direction of flow so that as the main stream moves into the chamber, in the vicinity of the cavity, the tapering counteracts the tendency of the laminer main stream to change its velocity profile, increasing its stability.

It is a feature of the invention that the outlet of the amplifier may take the form of a collector which is positioned colinearly with the undeflected main stream. Alternatively, depending upon the kind of control to be exercised, the outlet may take the form of a vent, with the collector displaced from the axis of the main stream. For discrete applications, where the amplifier is to be used on a two-state basis, i.e. "on"-"off" basis with NOR logic, the collector is desirably colinear with the main stream so that the application of a low pressure control stream results in turning the amplifier "off." Alternatively, for OR logic the collector is displaced from the main axis of flow, and there is no output unless there is an applied input. In either case, the net input to the control cavity is governed by the logic function to be accomplished.

For discrete amplifiers the control signal is discontinuous, such as a pulse. For proportional amplifiers, minor variations in one of the parameters of the control signal, such as pressure amplitude, result in proportional deflections of the main stream.

It is a feature of the invention that provision is made to prevent loading effects from interfering with the operation of the amplifier. This is done by the use of loading vents so that when the output impedance is high, or the output channel is blocked, the main stream can exit by way of the loading vents. For an amplifier in which the collector is displaced from the axis of the undeflected main stream flow, one of the vents also serves as the outlet.

It is a further feature of the invention that a fluid amplified may be adapted to recirculate the main stream fluid. In one embodiment, the recirculation is accomplished with a feedback loop that blocks one of the vents of the amplifier. When a loading vent is blocked, the control stream applied to deflect the main stream from the control cavity is largely unable to escape through the loading vent, even after substantial deflection has taken place. As a result, the amplifier has greater sensitivity to input control signals. This greater sensitivity facilitates operation of the amplifier on a discrete basis since switching from one discrete signal state to another can take place more readily.

It is a still further feature of the invention that passive logic components which provide substantial isolation for a plurality of inputs may be adapted for use with fluid amplifiers.

Another feature of the invention is that a fluid amplifier may be operated as a self-contained unit in which the vented main stream fluid is recirculated.

A still further feature of the invention is that selected fluids other than air permit substantially greater output pressures than can be obtained using air. Such fluids are gases like helium, which have a higher kinematic viscosity than air and liquids like water, which have a higher density than air. In addition, fluids having both a higher kinematic viscosity and a higher density than air, such as oils, are suitable.

Other aspects of the invention will become apparent after considering an illustrative embodiment, taken in conjunction with the drawings in which.

Figure 1:
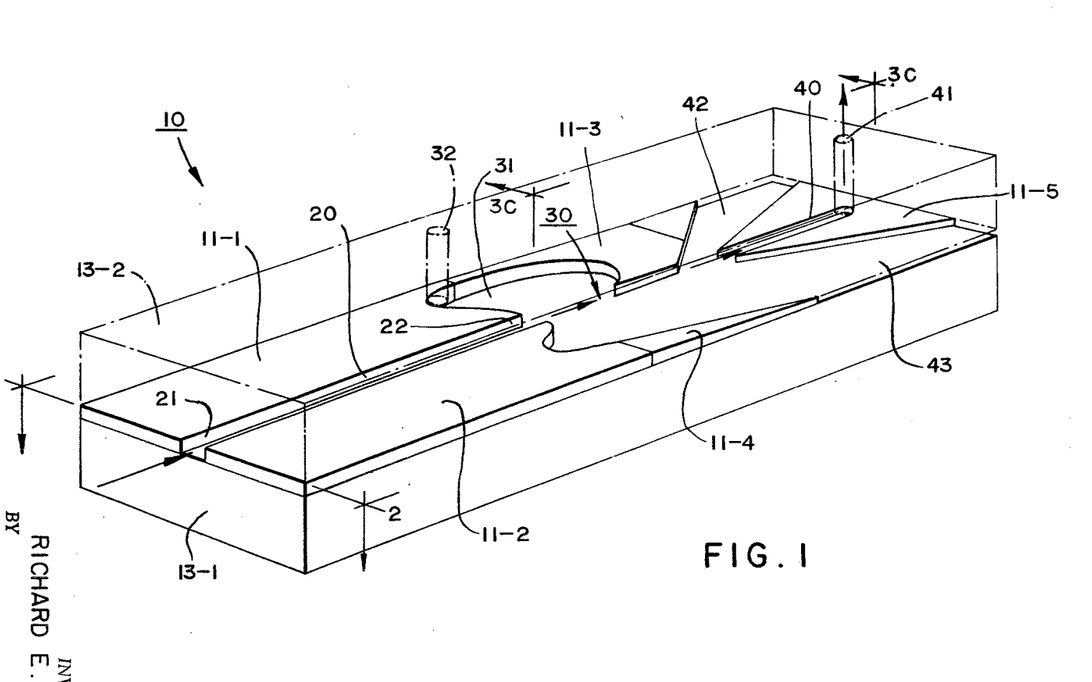
FIG. 1 is a partial perspective view of the fluid amplifier in accordance with the invention.

Turning to the drawings, the fluid amplifier unit 10 of FIG. 1 includes a supply channel 20, an interaction chamber 30 and an output channel or collector 40.

A main stream of fluid, represented by axial arrows, is applied at an inlet 21 of the supply channel 20 from a suitable fluid supply source (not shown) and is deflected beyond an outlet 22 of the channel 20 by a low pressure control stream. The control stream enters a control cavity portion 31 of the interaction region 30 by way of a control port 32 from a suitable fluid control source (not shown). The mode of interaction between the main stream and the control stream is described subsequently.

Illustratively in FIG. 1, the supply channel 20, the interaction chamber 30 and the output channel 40 are formed by plates 11–1 through 11–5 which are disposed between two support members 13–1 and 13–2. The lower support member 13–1 of FIG. 1 serves as a base, while the upper support member 13–2, shown in outline only, serves as a cover. The supply channel 20 is defined with respect to the support members 13–1 and 13–2 by the first two plates 11–1 and 11–2. The far ends of the plates 11–1 and 11–2 mark the beginning of the interaction chamber 30, which is completed by relatively widely separated tapered plates 11–3 and 11–4. The output channel is a central slot in the arrow-like plate 11–5.

It is to be understood that in practice the various channels and chambers can be formed in a variety of ways, such as by etching or molding. In addition, the supply channel 20 is shown as being of rectangular cross section, but other cross sections may be employed as well.

The supply channel 20 is made sufficiently long that the stream flow which extends to the interaction chamber 30, in the vicinity of the control cavity 31, is substantially laminar. However, at the exit point 22 of the supply channel 20, the main or supply stream is no longer constricted by the channel forming plates 11–1 and 11–2. Consequently, there is a tendency for the velocity profile of the main stream to change in the fashion described subsequently. This tendency is counteracted by tapering the interaction region of the interaction chamber 30. As shown in FIG. 1, the taper is formed by proportioning the control chamber plates 11–3 and 11–4 in the form of a wedge. During assembly of the amplifier, the base support member 13–1 adopts the contour of the wedges 11–3 and 11–4 and the interaction chamber 30 is shaped accordingly. It will be apparent that other forms of taper including those with nonlinear wall segments may also be employed.

Beyond the interaction chamber 30 is the output channel 40 which is centered in the plate member 11–5. At the end of the output channel 40 is an output port 41. Straddling the plate member 11–5, near the entrance to the output channel 40, are two ducts 42 and 43. For the embodiment of FIG. 1, the first duct 42 constitutes a loading vent with the main stream undeflected, while the second duct 43 constitutes an output vent when the main stream is deflected.

Figure 2A:
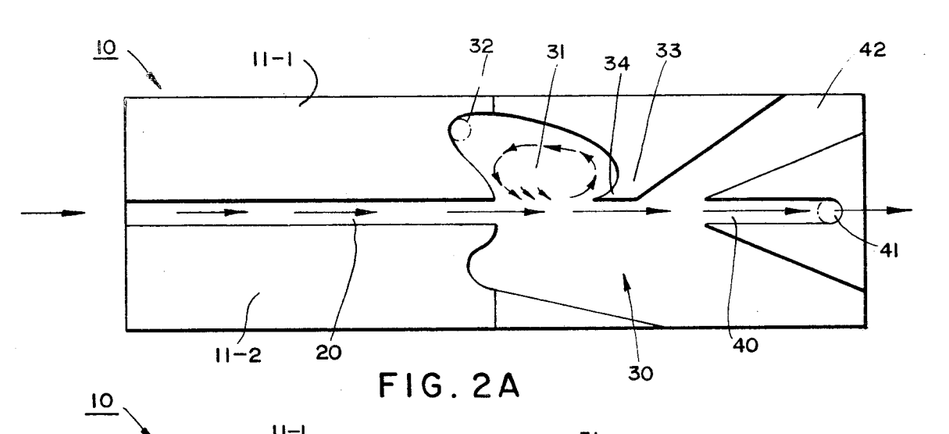
FIGS. 2A and 2B are cross-sectional views of the amplifier of FIG. 1.
Figure 2B:
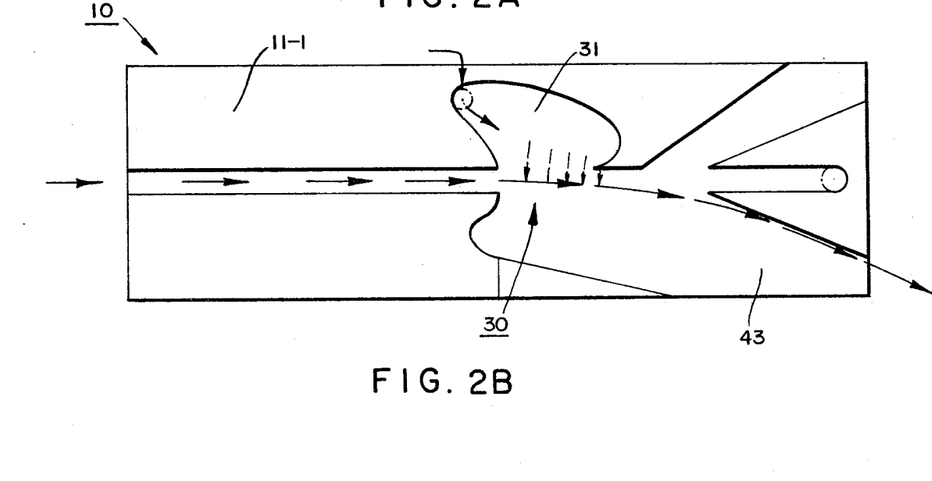

The general operation of the amplifier of FIG. 1 is demonstrated in the cross-sectional views of FIGS. 2A and 2B, taken with respect to the section line 2—2 of FIG. 1. In FIGS. 2A, with no control signal applied to the control port 32, the main stream, represented by axial arrows, enters the interaction chamber 30 and skirts the far end of the control cavity 31.

The far end of the control cavity 31 is bounded by a projection 33 that terminates in a cusp 34. The principal function of the projection 33 is to close the far end of the cavity so that when a control stream is applied, it initially acts upon the main stream in the interaction region 30 without appreciably venting through the nearby duct 42. In addition, the projection 33 is proportioned to prevent any deflection of the main stream flow, before the control signal is applied, by the entrainment of residual fluid from the control cavity 31. This is accomplished, in part, by having the vertex of the cusp 34 intercept and circulate the residual fluid that becomes entrained by the main stream flow. This aspect of the invention is discussed in greater detail below. In the absence of a control signal, the bulk of the main stream then proceeds by laminar flow to the output channel 40 and the output port 41, where it exits to a load.

Figure 3A:
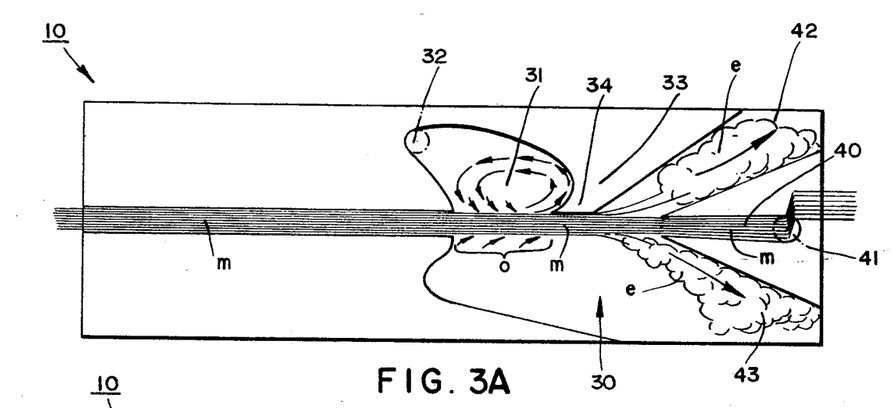
FIGS. 3A through 3C are cross-sectional views showing details of the interaction chamber of the amplifier of FIG. 1.
Figure 3B:
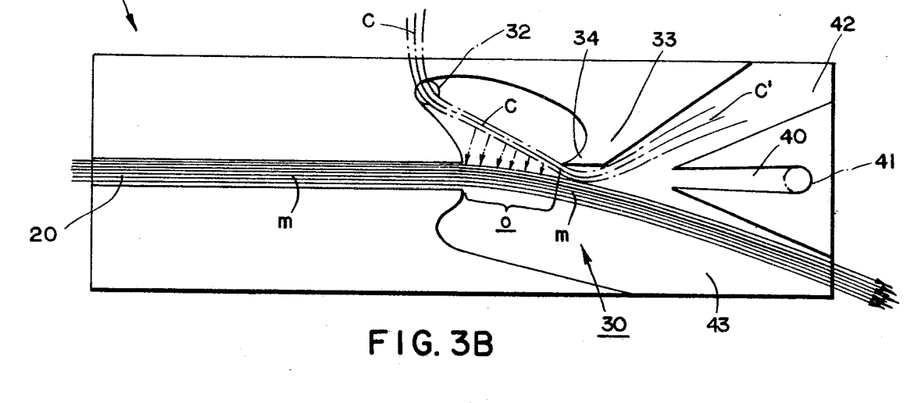

When a control signal is applied in the form of a low presure control stream, as illustrated by the stream entering the control port 32 in FIG. 3B, the control pressure distributes itself over the open side of the control cavity 31 in the interaction region 30 as indicated by the dashed-line pressure arrows. Consequently, although the control stream is of low pressure, its distribution over an extensive length of the main stream results in the application of a cumulature force in the interaction region 30 which is sufficiently great to deflect the main stream in a substantially nonturbulent fashion. Once deflected, the main stream exits from the amplifier 10 by way of the output vent 43.

Figure 3C:
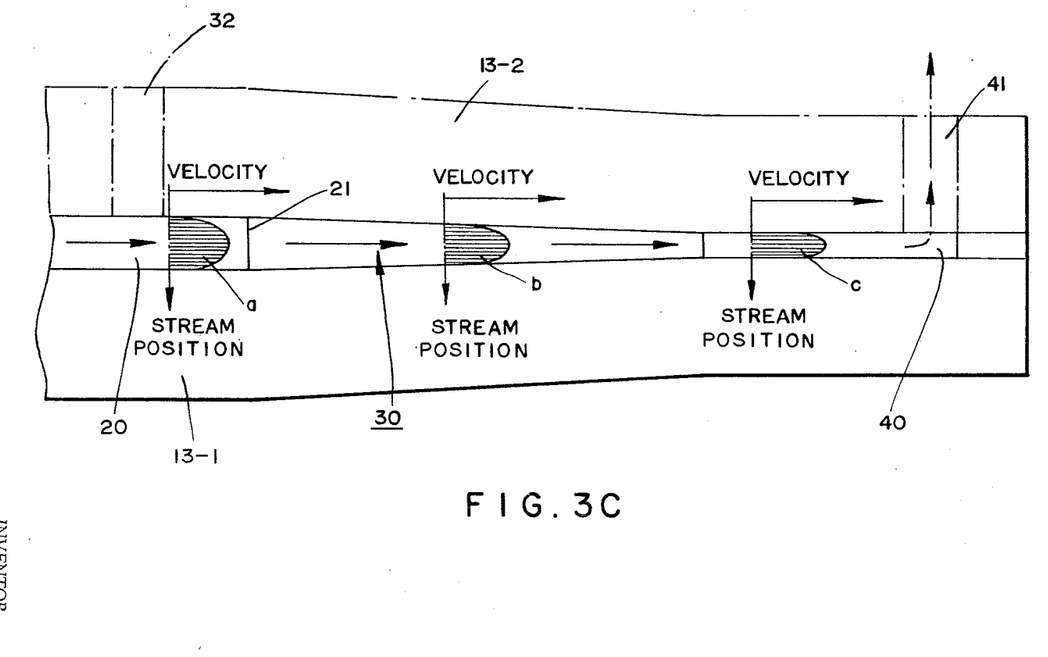

Aspects of the interaction region 30 of the fluid amplifier 10 of FIG. 1 are more specifically illustrated by FIGS. 3A through 3C, of which FIGS. 3A and 3B depict details of the fluid flow in the interaction region of the cross sections shown by FIGS. 2A and 2B.

As the main stream m in FIG. 3A passes the longitudinal opening o of the control cavity 30, it tends to entrain and transport residual fluid that remains in the cavity 31 even when there is no control signal at the control port 32.

In addition, the main stream entrains residual fluid in the output duct 43. The entrained fluids are illustrated by diagonal arrows which intercept the main stream flow.

Once the main stream m has traversed beyond the longitudinal opening o of the cavity 31 to the cusp 34, the entrained fluid of cavity origin is scooped from the main stream and redirected within the cavity, as indicated by the circulating arrows. This prevents any undesired bending, in the absence of a control signal, of the main stream m which would otherwise occur due to reduced pressure effects of the entrained cavity fluid.

Beyond the cusp 34, with no control signal applied, the main stream travels directly to the output channel 40 and exits to a load. If the output impedance at the duct 41 is high, there is partial blockage of the main stream flow. However, as illustrated in FIG. 3A, the vents 42 and 43 at the entrance to the output channel 40 alleviate adverse loading effects by turbulently deflecting any excess flow e.

When an express control signal c is applied through the control port 32 to the control cavity 31, the main stream m is laminarly deflected in the interaction region 30 as indicated in FIG. 3B. The deflection is laminar, as opposed to turbulent, because the control signal is of low pressure and is exerted over an appreciable length of the main stream m. Initially the control pressure, indicated by the dashed-line pressure arrows, is applied over the entire cavity opening o, which considerably exceeds the maximum cross-sectional dimension of the supply channel 20. Consequently, although the pressure effect at any particular position of the interaction chamber 30 is limited, the overall effect is sufficient to deflect the main stream m without significantly changing its orignal laminar characteristic. As the main stream m is deflected, there is an increase in the length over which the control pressure is exerted, and a portion c' of the control flow is vented by the loading duct 42.

In addition to being deflected, the main stream m undergoes a change in its velocity profile as it traverses the interaction region 30. The velocity profile is a graph showing the velocity variations of fluid particles in a direction transverse to the direction of flow. A representative graph of velocity variations for the main stream is given by the profile a of FIG. 3C near the exit point 21 of the supply channel. The view of FIG. 3C shows a portion of the amplifier 10 of FIG. 1 taken with respect to the section line 3C—3C. The profile a is approximately parabolic in outline, indicating that the particles at the center of the main stream have the greatest velocity, while those near the walls tend to be slowed by the effect of walls on viscous flow.

The stability of the main stream is reduced to the extent that the particles near the walls are slowed with respect to those near the center of the flow, particularly where the resulting velocity profile displays a reverse curvature (not shown) in the region extending between its minimum and maximum velocity points. A slowing action of this kind applies to laminar streams which entrain residual fluid and produces an accompanying reduction in stability, so that the streams become turbulent at lower supply pressures.

In particular, the main stream m of FIG. 3B dissipates some of its energy in the course of moving entrained residual fluid through the interaction region 30. This tends to alter the velocity profile a of FIG. 3C adversely. However, since the invention contemplates the control of laminar, as opposed to turbulent, flow, it provides for countering any adverse change in velocity profile by tapering the interaction region 30 as shown by FIG. 3C. As a result, the main stream, which is of rectangular cross section in the main channel 20, adopts a wedgelike configuration in the interaction region 30. This tends to accelerate the fluid flow in the interaction region 30 because the same volume of fluid must pass through a constantly decreasing cross-sectional area. The acceleration of flow, in turn, counters the tendency of the stream to slow down because of entrainment, thus increasing stability.

As seen by the representative velocity profile b of FIG. 3C for the main stream at an intermediate position in the interaction region 30, the parabolic form is maintained. With a sufficient taper, the velocities of the fluid particles near the walls 13-1 and 13-2, as shown by the profile c in the collector channel 40, are actually increased over and above their magnitudes at the entry point 21 of the interaction region 30, and there is a corresponding increase in stability.

Referring to FIGS. 3B and 3C, another consideration with respect to the interaction region 30 is that the slower moving particles of the main stream in the vicinity of the walls 13-1 and 13-2 of the tapered region 30 take longer to travel to the far end of the cavity 31 than do the faster moving particles at the center of the stream. When control pressure is present in the cavity 31, the slower moving particles are, therefore, acted upon for a longer period of time and tend to experience a greater deflection. This additional deflection gives rise to a limited secondary flow which widens the main stream near the walls 13-1 and 13-2 and permits the leakage of control pressure there, so that a greater magnitude of control flow is required to bend the main stream. The sensitivity of an amplifier is reduced to the extent that an increase in control signal is required to maintain a particular output level. However, by increasing the rate of flow near the walls of the interaction region, the taper brings about a reduction in the excess bending of the slower moving particles of the stream, which is accompanied by a corresponding reduction in the leakage of the control flow and an increase in sensitivity.

Consequently, the tapered interaction region 30, by comparison with an interaction region without taper, not only promotes increased stability of the main stream, but also increased sensitivity to control signals. As a result, for example, a discrete amplifier remains laminar for a higher energy output and may be switched to an "off" condition with a lower energy control signal.

It is to be noted that to reduce the leakage attributable to the slowly moving particles of the main stream it is desirable for the supply channel to have either a rectangular, or a square, cross section.

Figure 4:
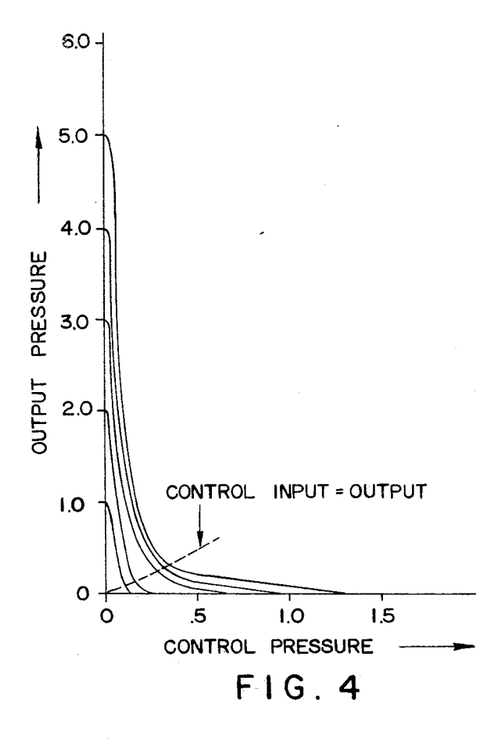
FIG. 4 is a set of characteristic curves for the amplifier of FIG. 1.

Representative characteristic curves showing the relationship between control pressure and output pressure for the amplifier of FIG. 1 are set forth in FIG. 4. The curves are for various main stream flows at a fixed rate. In the absence of a control input, the output pressure is the recovered portion of the main stream supply pressure. For a tested model of the invention with an interaction length from the exit point of the main channel to the entry point of the outlet channel of approximately 1 3/16 of an inch, and a pressure length at the side opening of the control cavity of approximately 9/16 of an inch, the output pressures of the family of curves shown in FIG. 4 ranged to near 5 inches of water. The measure of pressure in terms of inches of water refers to the increase in height in a column of water brought about by the pressure under consideration. As can be seen from the curves of FIG. 4, there are substantial regions where the control characteristics are relatively linear.

In one test of the invention, the main stream fluid was air with a velocity of 70 feet per second, resulting in a supply pressure of 9 inches of water and an output pressure of 2 inches of water. A control pressure of 0.2 of an inch of water produced full deflection, giving the amplifier an overall gain of ten. To assure laminar flow the input channel had a square cross section, 0.040 of an inch on a side, and the channel length was approximately 4 inches. The interaction region extended approximately 0.75 of an inch and had a taper converging from 0.040 inch at the exit point of the supply channel to 0.025 inch at the entry point of the collector. Because of the taper in the interaction region, the supply stream was able to remain stable, i.e. laminar, at a higher supply pressure than without taper.

Referring again to the characteristic curves of FIG. 4, they indicate that when the main stream has been partially deflected by an increment of control pressure, a considerably greater increment is generally required to produce a further deflection of comparable extent, particularly where an output pressure below 1 inch of water is desired. For fluid amplifiers which are used in discrete logic circuitry, it is desirable that the characteristic curves exhibit an abrupt change, i.e. that the device is able to switch rapidly from an "on" condition to an "off" condition for a relatively low level control signal.

Figure 5A:
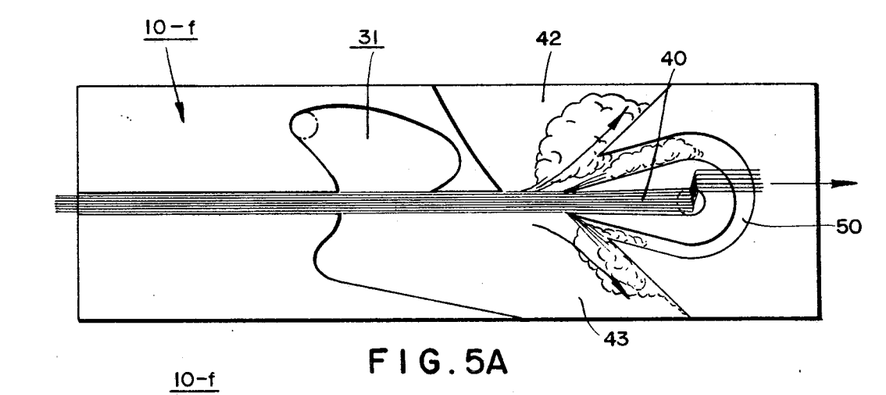
FIGS. 5A and 5B are cross-sectional views of the amplifier of FIG. 1, as adapted for feedback operation.
Figure 5B:
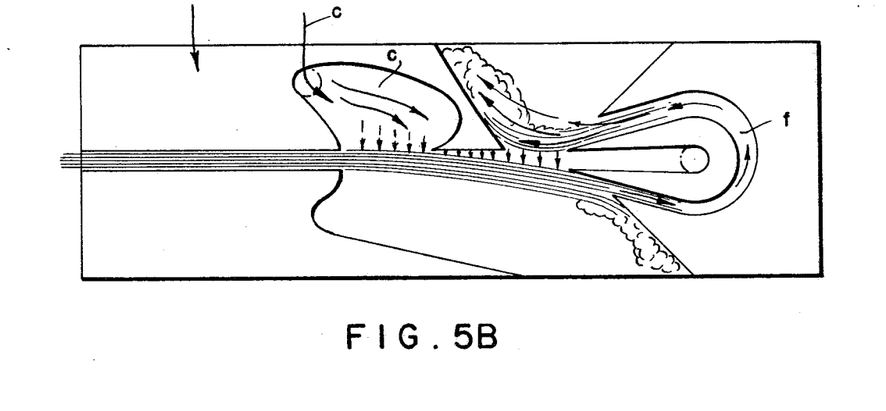

In order for fluid amplifiers to be more suitable for digital logic operations, the invention provides an adapted amplifier 10–$f$ of FIGS. 5A and 5B, which is a feedback version of the amplifier 10 of FIG. 1. The latter amplifier is structured such that when it is partially switched to an "off" condition, i.e. the control signal produces a significant reduction in output pressure, it becomes less sensitive to further increases in control pressure. This happens because some of the fluid from the control chamber 31 escapes through a vent, as illustrated in FIG. 3B by the partial venting of the control stream $c'$ through the loading vent 42.

To limit the release of control pressure during operation of the amplifier 10–$f$ of FIGS. 5A and 5B, the invention provides for introducing a feedback loop formed by a channel 50 that encircles the output channel 40 from the output vent 43 to the loading vent 42. In effect, the feedback channel 50 blocks the loading vent 42 when the amplifier 10–$f$ is switched to its "off" state, indicated by FIG. 5B. This blocking action does not interfere with the operation of the amplifier 10–$f$ since the primary function of the loading vent 42 is to release the main stream flow when the amplifier 10–$f$ is in its "on" state.

The feedback channel 50 operates by diverting a portion of the deflected main stream and circulating the diverted feedback flow $f$ to loading vent 42. The return flow $f$ of the main stream fluid blocks the escape of any portion of the control stream $c$ through the loading vent 43. Consequently, the amplifier has increased sensitivity after partial deflection of the main stream. This increase in sensitivity is illustrated by the characteristic curves of FIG. 6 for an amplifier 10 with feedback.

Figure 6:
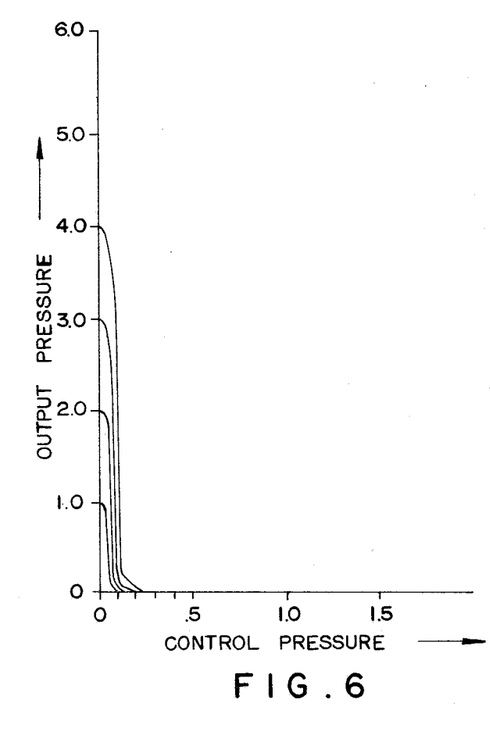
FIG. 6 is a set of characteristic curves for the amplifier of FIG. 5A.

As shown by FIG. 6 the output pressure changes abruptly, falling almost to zero, for a small increment of control pressure. Thus, for a test model of the invention with an interaction length of approximately $13/16$ of an inch and a pressure length of approximately $7/16$ of an inch, an input pressure change of slightly over 0.1 of an inch of water was accompanied by a drop in output pressure to substantially zero for main stream pressures ranging to 4 inches of water. This kind of change in output pressure is to be contrasted with the performance indicated by the curves of FIG. 4 where, for another test model of the invention without feedback a control pressure exceeding 0.1 of an inch of water permitted a significant output flow, and a disproportionate increase in control pressure was required to reduce the output pressure further.

Figure 7A:
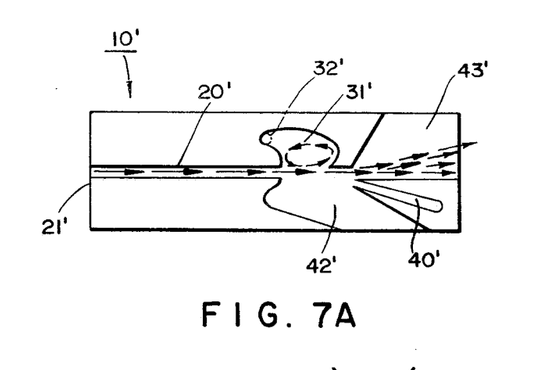
FIGS. 7A and 7B are cross-sectional views of a modification of the amplifier of FIG. 1.
Figure 7B:
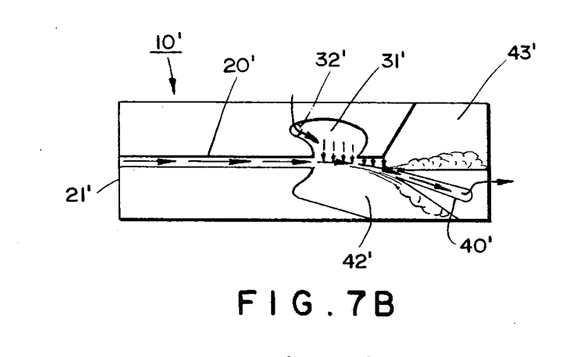

An alternative embodiment of the invention is shown in FIGS. 7A and 7B. This embodiment 10′ is a variation of the amplifier 10 shown in FIG. 1, with the collector or outlet channel 40′ displaced from the axial line of flow. As a result, the main stream flow, in the absence of a control signal, exits by way of an output vent 43′.

However, when a low pressure control input is applied to the cavity 31′, in the fashion described previously for the amplifier 10 of FIG. 1, the main stream flow is deflected according to FIG. 7B into the output channel 40′, from which it exits to a load. Thus, the amplifier 10′ can be regarded as being "off" until it is turned "on" by a control signal. Other aspects of the amplifier 10′ of FIGS. 7A and 7B are similar to those discussed previously for the amplifier 10 of FIG. 1.

Figure 8A:
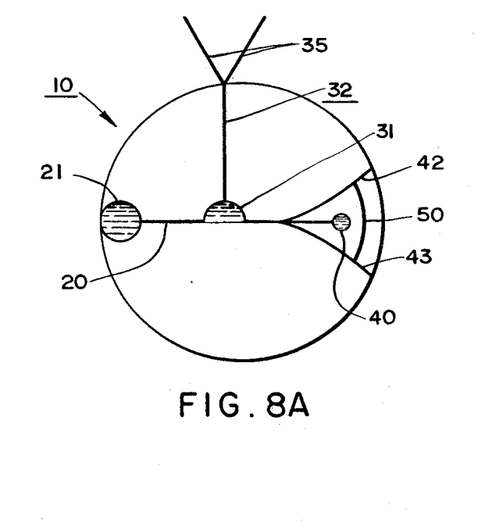
FIGS. 8A and 8B are diagrams of symbolic representations for the amplifiers of FIGS. 1 and 7A.

All of the devices illustrated by FIGS. 1, 5A and 7A may be employed either as proportional amplifiers or a discrete amplifiers. For fluid logic applications of the discrete variety, a representative symbol for the amplifier of FIG. 5A is given by FIG. 8A. The symbol shows an inlet 21 for the main channel 20, the control cavity 31, the loading and output vents 42 and 43, and the feedback channel 50. The main channel 20 extends from the inlet 21 to a collector 40. A control port 32 interconnects the control cavity 31 with a branching junction 35 to which a plurality or control inputs may be applied. Similarly, the amplifier 10′ of FIG. 7A may be represented simbolically according to FIG. 8B.

The various fluid amplifier embodiments of FIGS. 1, 5A and 7A have a single input port 32 or 32′ for the control signal. While they may be employed with multichannel control streams, care must be exercised to prevent the various inputs from interacting with each other. For this purpose, the invention provides passive control units of the kind illustrated by FIGS. 9A through 9E. The various units 50–1 through 50–5 of FIGS. 9A through 9E, respectively, are all configured to be suitable for use with a fluid amplifier by being provided with isolating vents V.

The units 50–1 through 50–5 of FIGS. 9A through 9E are particularly suitable for performing logic operations with fluid amplifiers. Such operations require that the amplifier control stream have a multiplicity of inputs. For example, if the amplifier of FIG. 1 is to serve as a NOR gate, any of a number of applied control inputs must be able to deflect the main stream. Ordinarily this would entail connecting a number of separate inputs lines to the input port.

However, in accordance with a further aspects of the invention, an appropriate net input to the control port of a fluid amplifier, for an arbitrary logic function, is produced by vented, passive logic components. The logic components are passive in the sense that they do not employ supply pressure. As a result, no amplification occurs and the net output pressure of the passive logic component is less than that of any of the inputs. In general, such passive logic components permit simplicity of design and achieve total input isolation. On the other hand, because of the low output pressure of the passive logic components, they are primarily adapted to use as inputs to an amplifier.

For the particular passive logic units 50–1 through 50–5 of FIGS. 9A through 9E, there is a single output channel O that is adapted for connection to the input port of an amplifier. The output channel O is straddled by vents V beyond which a plurality of various input channels A through D are oriented in accordance with the logical operation that is to be accomplished.

Figure 9A:
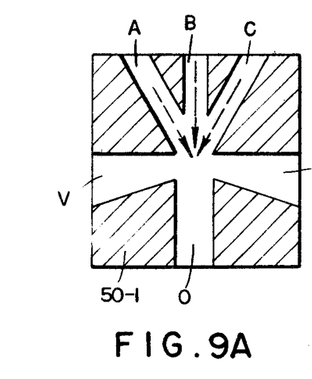
FIGS. 9A through 9E are diagrams of logic components for use with fluid amplifiers.

In FIG. 9A the input channels A, B and C are disposed so that their respective control streams converge at the output channel O. Consequently, the passive logic unit 50–1 of FIG. 9A acts as an OR gate for which an input on any of the channels A, B and C will result in a control input to a fluid amplifier of the kind shown in FIG. 7A. If the amplifier is of the kind shown in FIG. 1, the gate 50–1 of FIG. 9A serves a NOR function, i.e. any input will turn the amplifier "off."

Figure 9B:
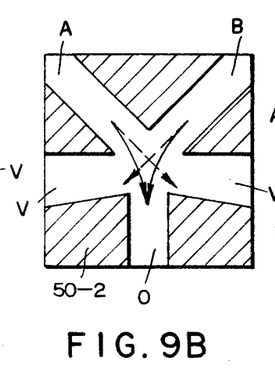

In the modification 50–2 of the gate 50–1 of FIG. 9A shown in FIG. 9B, the input channels A and B are oriented so that their control streams individually escape into the vents V. However, when the control streams are applied simultaneously, they combine to produce an amplifier input at the output channel O. Thus, the unit 50–2 of FIG. 9B is an AND gate.

Figure 9C:
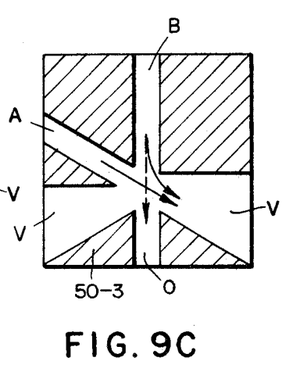

A further modification 50–3 of the gate 50–1 of FIG. 9A is shown in FIG. 9C. For this unit there is an output when an input is present on channel B, but the output terminates when inputs are present on both channels A and B. The result is a gate which one, but not both, of two inputs will produce an output.

Figure 9D:
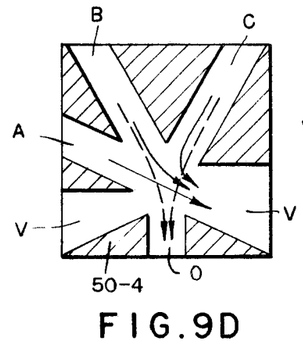

A modification 50–4 of the gate 50–1 of FIG. 9A is shown in FIG. 9D, in which there are OR inputs on channels B and C and a NOT input on channel A.

Figure 9E:
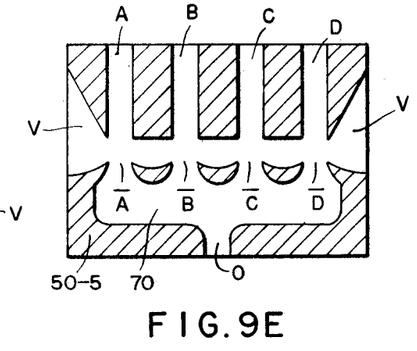

Finally, the gate 50–5 of FIG. 9E is of the AND variety. Input channels A, B, C and D are positioned so that flow is directed to collectors $\overline{A}$, $\overline{B}$, $\overline{C}$ and $\overline{D}$, all of which are coupled to a common cavity 70. Unless there is an input on all channels, the applied inputs will be vented.

The foregoing logic units 50–1 through 50–5 may be employed in a wide variety of ways. In a tested embodiment of the invention with passive logic units, a fan-out of three was attained. When the output of the amplifier was unattenuated by losses such as those occasioned by passive logic units, a fan-out of seven was attained.

Figure 8B:
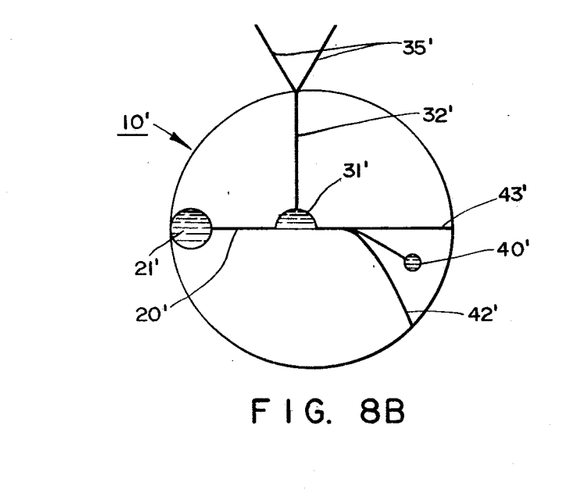
Figure 10:
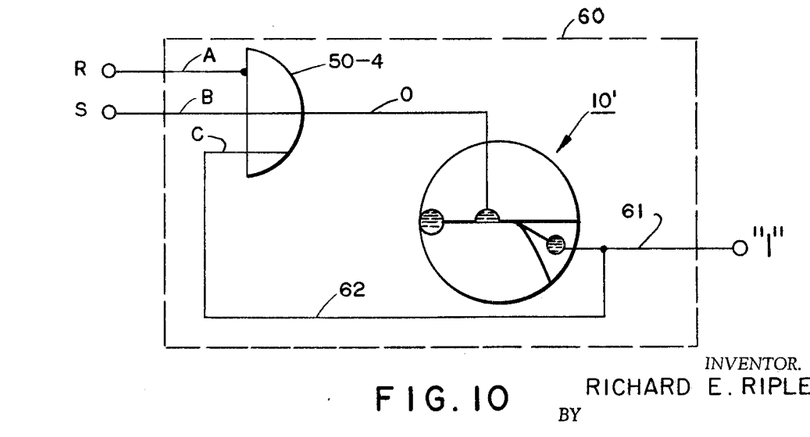
FIG. 10 is a schematic diagram of a two-state device constructed in accordance with the invention.

One employment for the unit 50–4 of FIG. 9D as INHIBIT-OR gate is illustrated in FIG. 10, which is a memory device 6 employing a single fate 50–4 and a single amplifier 10' of FIG. 7A. The INHIBIT-OR gate 50–4 is representtd by a half-moon gate block symbol with inputs that extend through the gate block for OR channels B and C and a dot-terminated input for the inhibit channel A. The amplifier is represented by the symbol of FIG. 8B. The resultant structure may be described as a fluid flip-flop," since it is a two-state device that can be set and reset from respective terminals S and R. When tht flip-flop is turned "on," i.e. "set" by a signal at the set terminals S associated with the OR channel B in the gate, the main stream is deflected to the collector of the amplifier 10' which is then in its "1" state, as manifested by main stream flow on an output channel 61 of the flip-flop 60. The output channel 61 is tapped by a channel 62 that connects to one of the inlets C of the OR function portion of the gate 50–4. This maintains the control pressure at the control cavity of the amplifier 10', keeping the latter in its "on" state until a "reset" signal is applied to a channel A in the INHIBIT portion of the gate 50–4. The inhibit signal terminates the control pressure by deflecting the stream on the gate input channel C, with the result that the main sream of the amplifier returns to its original condition and the amplifier output is in a "0" state. Thus, by using a passive logic component of the kind shown in FIG. 9D, a memory device is realized with a single amplifier.

An "inverse" flip-flop, which is in a "0" state, rather than a "1" state, after being set, may be realized by modifying the feedback amplifier 10–f of FIG. 5A and substituting it for the amplifier 10' of FIG. 10. To suitably modify the amplifier 10–f of FIG. 5A, an additional channel is formed between the output vent 43 and the feedback channel 50. The duct 52 of FIG. 10 is then connected to the additional channel, instead of to the output channel 61. When the inverse flip-flop is set to its "0" state by a control signal at the set terminal S, a portion of the deflected main stream is applied to the INHIBIT-OR gate 50–5 to maintain the feedback amplifier in its "off" condition until it is reset by a control signal at the reset terminal R.

Figure 11:
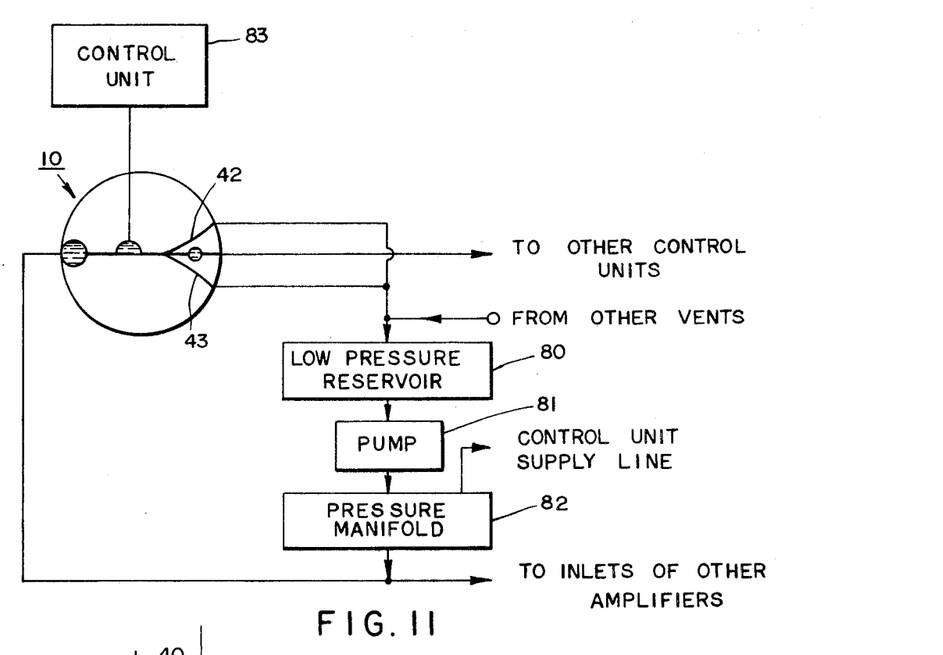
FIG. 11 is a partial schematic and block diagram of an enclosed fluid amplifier system.

A further embodiment of the invention is shown in FIG. 11, for which the vented main stream fluid is collected in a low pressure reservoir 80. This is accomplished by coupling the loading and outlet vents from the amplifier 10, and from other amplifiers of the system, to the reservoir 80. Beyond the reservoir the fluid is raised to suitable pressure by a pump 81 and applied to a supply pressure manifold 82. The latter permits the vented fluid to be recirculated to the control point of the amplifier, as well as any other amplifier of the overall system. The amplifier 10 is controlled by a separate unit 83, but control signals may also be obtained by tapping the supply pressure manifold through a pressure reduction unit (not shown). An enclosed system permits the use of fluids, such as helium, which would be uneconomical otherwise.

Gases like helium are particularly suitable for use with fluid amplifiers in accordance with the invention. They have a high value of kinematic viscosity, which allows them to remain laminar at much higher velocities than fluids such as air. In a tested model of the invention a helium system resulted in output pressures ten times as high as air and a frequency response at least four times at great. Conversely, the invention is advantageously used with liquids, such as water, which have a greater density than air. Although their kinematic viscosity is lower, their greater density permits operation at higher output pressures.

For one class of suitable fluids for use in an enclosed system of the kind shown by FIG. 11, the fluids are "Newtonian" in the sense that their viscosity does not change with velocity and they satisfy the relationship given by Equations 1A and 1B:

$$\frac{v_x^2}{v_a^2} \geq \frac{d_a}{d_x} \tag{1A}$$

or, conversely, $$\frac{d_x}{d_a} \geq \frac{v_a^2}{v_x^2} \tag{1B}$$

where $v_x$ is the kinematic viscosity of a suitable fluid other than air, $v_a$ is the kinematic viscosity of air, $d_x$ is the density of a suitable fluid other than air, and $d_a$ is the density of air.

The limiting case for Equations 1A and 1B occurs when the suitable fluid is air and the equations reduce to the identity of unity equals unity. Thus, one class of suitable fluids includes those fluids for which the square of the ratio of the kinematic viscosity of the fluid to that of air equals or is greater than the inverse ratio of densities. There are some fluids, such as most ordinary oils, for which both kinematic viscosity and density are greater than for air. In the case of helium, the density is lower than that of air, but the kinematic viscosity is relatively greater.

Figure 12:
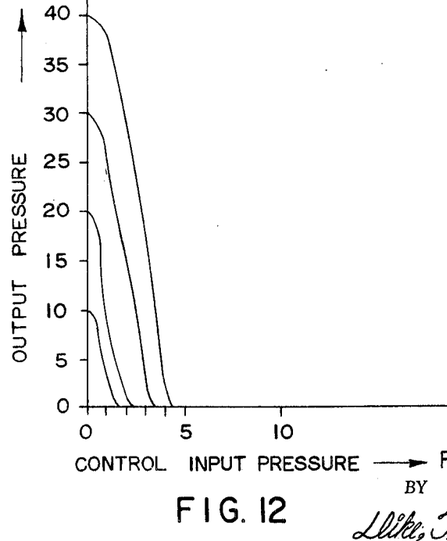
FIG. 12 is a set of characteristic curves for an amplifier in the system of FIG. 11.

Representative characteristic curves for a tested helium system with a frequency response of over 60 cycles per second are set forth in FIG. 12.

Other adaptations and modifications of the invention will occur to those skilled in the art.

I claim:

1. A fluid control device comprising a supply channel passage for providing a laminar main stream of fluid flow, an inlet passage for providing a command signal flow, at least two exit passages, one of which is adapted to receive the main stream when no command signal is applied in the command inlet passage, and the other exit passage adapted to receive the main stream when a command signal is applied in the command inlet passage, an interaction chamber communicating with said supply channel passage and said exit passages, a control cavity into which the inlet passage empties, said control cavity having an open side face to face with the interaction chamber, the open side of control cavity being substantially greater in width than the width of the supply channel passage in a horizontal plane so that the presence of a command signal produces a static pressure at the open side of the cavity to deflect the main stream of fluid flow passing through the interaction chamber, and said interaction chamber tapered in the vertical plane such that the interaction chamber decreases in depth downstream from the supply channel passage.

2. A fluid control device comprising a supply channel passage for providing a laminar main stream of fluid flow, an inlet passage for providing a command signal flow, at least two exit passages, one of which is adapted to receive the main stream when no command signal is applied in the command inlet passage, and the other exit passage adapted to receive the main stream when a command signal is applied in the command inlet passage, an interaction chamber communicating with said supply channel passage and said exit passages, and a control cavity into which the inlet passage empties, said control cavity having an open side face to face with the interaction chamber, the open side of control cavity being substantially greater in width than the width of the supply channel passage in a horizontal plane so that the presence of a command signal produces a static pressure at the open side of the cavity to deflect the main stream of fluid flow passing through the interaction chamber, and said control cavity having means for circulating fluid that becomes entrained therein to prevent bending of the main stream in the absence of a control signal.

3. A fluid control device according to claim 2 in which said means for circulating includes a cusp.

4. In a fluid control device having a supply passage for providing a main stream of fluid, a control signal passage, an outlet passage having a mouth for receiving said main stream of fluid, an interaction chamber communicating with said passages, the invention characterized in that there is provided a feedback channel for receiving feedback fluid from said main stream as it passes to one side of the mouth of said outlet passage and thereafter circulating said feedback fluid to the opposite side of said mouth of said outlet passage in order to increase the sensitivity of the device.

5. In a device according to claim 4 in which the feedback channel and the mouth of the outlet lie in substantially the same horizontal plane.

6. In a device according to claim 4 in which the feedback channel encircles the mouth of the outlet passage.

7. A fluid control device comprising a supply channel passage for providing a laminar main stream of fluid flow, an inlet passage for providing a command signal flow, at least two exit passages, one of which is adapted to receive the main stream when no command signal is applied in the command inlet passage, and the other exit passage adapted to receive the main stream when a command signal is applied in the command inlet passage, an interaction chamber communicating with said supply channel passage and said exit passages, a control cavity into which the inlet passage empties, said control cavtiy having an open side face to face with the interaction chamber, said open side of the control cavity being substantially greater in width than the width of the supply channel passage taken in a horizontal plane so that the presence of a command signal produces a static pressure at the open side of the cavity to deflect the main stream of fluid flow passing through the interaction chamber, and a vent passage to vent the flow of control signal fluid.

8. In a fluid control device having inlet means for providing a laminar main stream of fluid flow, outlet means positioned for receiving the main stream of fluid flow, an interaction chamber positioned between said inlet mean sand said outlet means, the invention characterized in that there is provided a control cavity for providing a static pressure along one side of the main stream as the main stream passes through the interaction chamber, said control cavity providing said static pressure for a distance along said main stream which is much greater than the width of the main stream as it passes through the interaction chamber and in that said control cavity includes a non-linear wall portion for circulating fluid to prevent bending of the main stream.

9. In a fluid control device having inlet means for providing a laminar main stream of fluid flow, outlet means positioned for receiving the main stream of fluid flow, an interaction chamber positioned between said inlet means and said outlet means, the invention characterized in that there is provided a control cavity for providing a static pressure along one side of the main stream as the main stream passes through the interaction chamber, said control cavity providing said static pressure for a distance along said main stream which is much greater than the width of the main stream as it passes through the interaction chamber, and in that the interaction chamber is tapered such that the depth of the interaction chamber decreases downstream from the inlet means.

References Cited
UNITED STATES PATENTS

| | | | |
|---|---|---|---|
| 3,405,736 | 10/1968 | Reader et al. | 137—81.5 |
| 3,148,691 | 9/1964 | Greenblott | 137—81.5 |
| 3,181,546 | 5/1965 | Boothe | 137—81.5 |
| 3,182,674 | 5/1965 | Horton | 137—81.5 |
| 3,217,727 | 9/1965 | Spyropoulos | 137—81.5 |
| 3,240,221 | 3/1966 | Pan | 137—81.5 |
| 3,269,419 | 8/1966 | Dexter | 137—81.5 |
| 3,362,421 | 1/1968 | Schaffer | 137—81.5 |
| 3,362,422 | 1/1968 | Toma | 137—81.5 |

FOREIGN PATENTS 1,454,063  8/1966  France.

OTHER REFERENCES

IBM Technical Disclosure Bulletin, Laminar Attachment Fluid Amplifier, by R. P. Johnson.

IBM Technical Disclosure Bulletin, Multiple or Pneumatic Logic Element, by R. E. Norwood.

M. CARY NELSON, Primary Examiner

W. R. CLINE, Assistant Examiner